US 8,396,924 B2

(12) United States Patent
Baldwin et al.

(10) Patent No.: US 8,396,924 B2
(45) Date of Patent: Mar. 12, 2013

(54) CONTENT MANAGEMENT USING A WEBSITE (75) Inventors: James A. Baldwin, Redwood City, CA (US); Peter J. Potrebic, Calistoga, CA (US)

(73) Assignee: Microsoft Corporation, Redmond, WA (US)

( * ) Notice: Subject to any disclaimer, the term of this patent is extended or adjusted under 35 U.S.C. 154(b) by 126 days.

(21) Appl. No.: 12/144,605

(22) Filed: Jun. 23, 2008

(65) Prior Publication Data
US 2009/0319603 A1 Dec. 24, 2009

(51) Int. Cl.
G06F 15/16 (2006.01)
G06F 15/173 (2006.01)
H04N 7/16 (2006.01)

(52) U.S. Cl. ......... 709/205; 709/227; 709/229; 725/135

(58) Field of Classification Search ........... 709/201–203
See application file for complete search history.

(56) References Cited

U.S. PATENT DOCUMENTS

| 6,438,579 B1 | 8/2002 | Hosken |
| 2003/0115585 A1 | 6/2003 | Barsness et al. |
| 2006/0059260 A1 | 3/2006 | Kelly et al. |
| 2006/0271997 A1 | 11/2006 | Jacoby et al. |
| 2007/0028266 A1 | 2/2007 | Trajkovic et al. |
| 2007/0150515 A1 | 6/2007 | Brave et al. |
| 2007/0156805 A1 | 7/2007 | Bristol et al. |
| 2007/0157266 A1* | 7/2007 | Ellis et al. ............... 725/89 |
| 2007/0169165 A1* | 7/2007 | Crull et al. .............. 725/135 |
| 2007/0198740 A1* | 8/2007 | Peters et al. ............. 709/245 |
| 2007/0250863 A1 | 10/2007 | Ferguson |
| 2008/0040673 A1 | 2/2008 | Zuckerberg et al. |
| 2008/0077574 A1 | 3/2008 | Gross |
| 2008/0148358 A1* | 6/2008 | Denny et al. ............... 726/4 |
| 2008/0214149 A1* | 9/2008 | Ramer et al. ............. 455/414.1 |
| 2008/0243853 A1* | 10/2008 | Reding et al. ............ 707/9 |
| 2009/0307361 A1* | 12/2009 | Issa et al. ................ 709/229 |

OTHER PUBLICATIONS

Pouwelse, et al., "P2P-based PVR Recommendation using Friends, Taste Buddies and Superpeers", Jan. 9, 2005, IUI'05. pp. 6.
Auchard, "YouTube Helps Video Creators Track Viewership", Mar. 27, 2008, Reuters Limited, pp. 3.

* cited by examiner

*Primary Examiner* — Ashok Patel
*Assistant Examiner* — Evans Desrosiers
(74) *Attorney, Agent, or Firm* — Wolfe-SBMC (57) ABSTRACT

Content management using a website is described. In an implementation, one or more computer readable media include instructions that are executable to provide an option, via a website, that is selectable by a first user though interaction with a website to specify that a second user is permitted, through interaction with the website, to cause content to be recorded locally at a client of the first user.

20 Claims, 6 Drawing Sheets

502
Provide a social network website having a plurality of web pages that are accessible via a network

504
Expose one or more modules that are configured to be installed at the social network website to manage content

506
Cause the one or more modules to be installed at the social network website such that functionality of the one or more modules is available via one or more webpages

508
Collect a content list from each of a plurality of clients that describes which content was output by a respective one of the clients

510
Configure at least a portion of a respective content list to be output via a respective one of a plurality of web pages of the social network website

512
Form a recommendation to view particular content by comparing content lists, one with another

602
Provide an option, via a website, that is selectable by a first user to specify that a second user is permitted, through interaction with the website, to cause content to be recorded locally at a client of the first user

604
Identify the second user that is permitted to cause content to be recorded at the client of the first user

606
Output via one or more webpages of the website functionality that permits the specified user to specify which content is to be recorded for the first user

608
Cause the specified content to be recorded at a client that is local to the first user

*Fig. 6*

CONTENT MANAGEMENT USING A WEBSITE

BACKGROUND

As the amount of content continues to increase, so too does the difficulty in locating particular content that might be of interest. For example, users were traditionally able to obtain a relatively limited number television programs via a broadcast network. This number continues to increase to the point where users are currently able to access hundreds and even thousands of television channels to receive television programs. Consequently, because a user has access to a multitude of television programs via these hundreds of television channels, it may be difficult for the user to locate a particular television program of interest.

SUMMARY

Content management using a website is described. In an implementation, one or more computer readable media include instructions that are executable to provide an option, via a website, that is selectable by a first user though interaction with a website to specify that a second user is permitted, through interaction with the website, to cause content to be recorded locally at a client of the first user.

In an implementation, a content list is collected from each of a plurality of clients that describes which content is output by a respective one of the clients. At least a portion of a respective one of the content lists is configured to be output via a respective one of the plurality of web pages of a social network website.

In an implementation, an apparatus includes a processor and memory that is configured to maintain one or more modules that are executable on the processor. The one or more modules are executable to provide a social network website having a plurality of web pages that are accessible via a network. The one or more modules are also executable to make one or more recommendations, via one or more of the web pages, regarding one or more items of content based on which content was viewed by one or more users of the social network website.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

The content choices that are available to users are ever increasing. For example, a user may have access to a multitude of television programs via hundreds of television channels. A similar proliferation may also be observed for other forms of content, such as digital music. Therefore, a user may have difficulty in locating particular content of interest.

Content management using a website is described. In an implementation, a website (e.g., a social network website) may collect a content list that describes which content is output by which clients, e.g., which television programs are output by televisions, set-top boxes and/or other devices of the user. The content list may be collected in a variety of different ways, such as by manual entry by a user, collected automatically and without user intervention by the social network website through interaction with the client, and so on.

The content list may then serve as a basis for making recommendations regarding other television programs that may be viewed by the user and/or other users. For example, the content list may be compared with content lists of other users, e.g., "friends" of the user specified in the social network website. Content that is included in the content list of the friends but is not included in the content list of the user, for instance, may then be used as a basis for making a recommendation to the user and/or the friends. Thus, these techniques may be employed to make recommendations based on the "friends" of the user. Further discussion of techniques that may be used to make recommendations based on monitored content output may be found in relation to the following figures.

In another implementation, an option is provided by a website (e.g., a social networking website) to enable one or more users to record content for another user. For example, a user of a social network website may select an option that specifies that friends of the user are permitted to specify a particular item of content (e.g., a television program) is to be recorded on a personal video recorder (PVR) of the user, e.g., such as at the user's household. For instance, the user may specify a particular user that is permitted to record content, a user group (e.g., friends of the user of the social network website), and so on. In an implementation, a user may also manage how this content recordation is to be performed, such as by listing a maximum number of items of content that may be recorded by a particular user or group of users, and so on. Further discussion of an option to permit other users to record content for a particular user may also be found in relation to the following figures.

In the following discussion, an example environment and systems are first described that are operable to perform techniques to manage content. Example procedures are then described that may be employed in the example environment, as well as in other environments. Although content management is described in relation to a television environment in the following discussion, it should be readily apparent that a wide variety of environments (e.g., social network websites) may be utilized without departing from the spirit and scope thereof, such as to manage digital music via a network.

Example Environment

Figure 1:
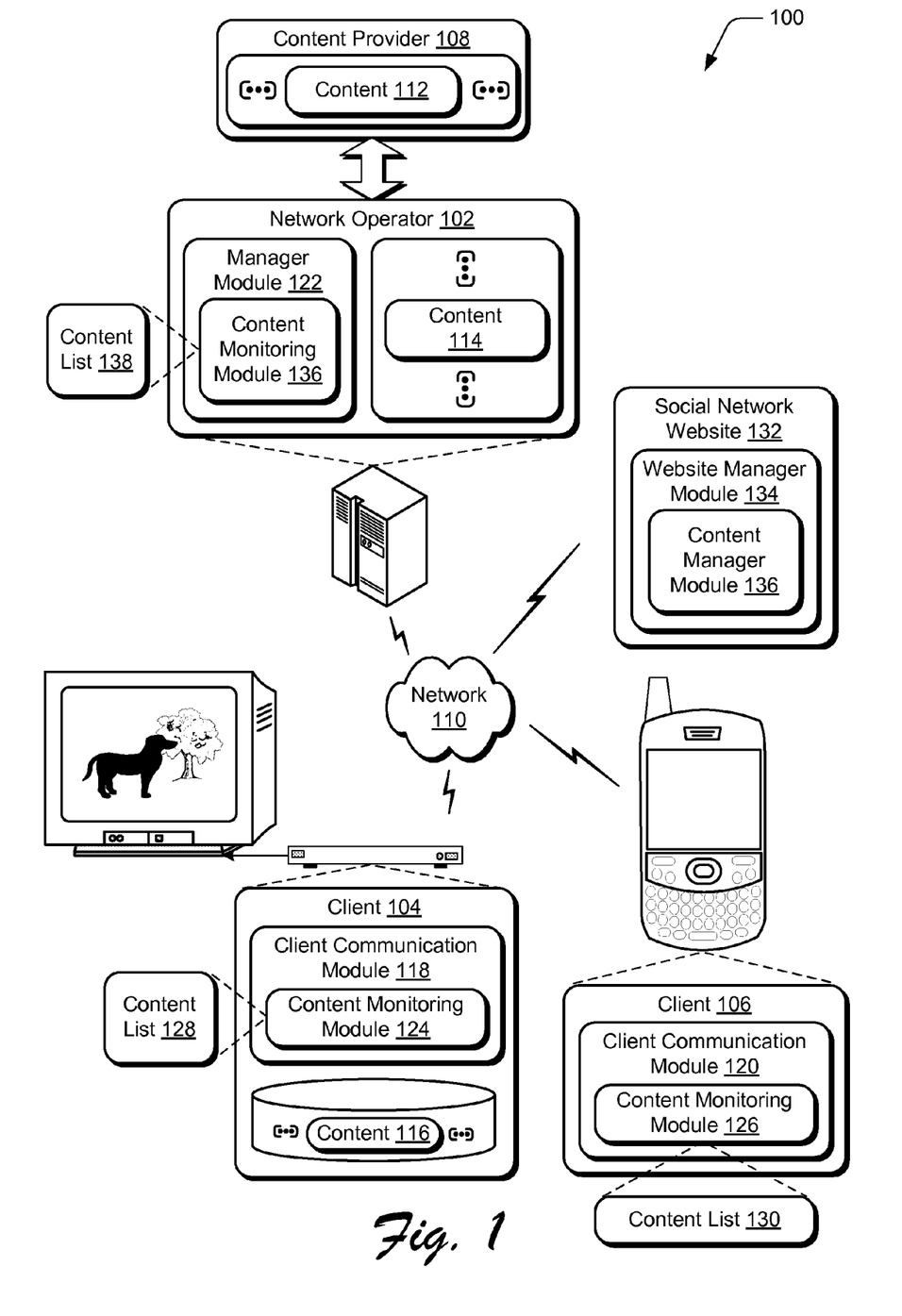
FIG. 1 is an illustration of an environment in an example implementation that is operable to employ techniques to manage content using a website.

FIG. 1 is an illustration of an environment 100 in an example implementation that is operable to employ techniques to manage content using a website. The illustrated environment 100 includes a network operator 102 (e.g., a "head end"), first and second clients 104, 106 and a content provider 108. The network operator 102, the first client 104 and the second client 106 are illustrated as communicatively coupled, one to another, via a network 110. Although a single network 110 is shown, the network 110 may be representative of a plurality of network connections that may be achieved using a single network or multiple networks, e.g., network 110 may be implemented via the Internet, a cable network, an "over the air" broadcast network, and so on. In the following discussion, the network operator 102, the clients 104, 106, the content provider 108 and components thereof may also be representative of one or more entities, and therefore by convention reference may be made to a single entity (e.g., the client 104) or multiple entities (e.g., the clients 104, the plurality of clients 104, and so on).

The clients 104, 106 may be configured in a variety of ways. For example, the clients 104, 106 may be configured as a computer that is capable of communicating and/or receiving communications of data over the network 110, such as a television and set-top box as illustrated for client 104, a mobile station, an entertainment appliance (e.g., a game console), a set-top box communicatively coupled to a display device as illustrated, a wireless phone as illustrated for client 106, and so forth. Thus, the clients 104, 106 may range from full resource devices with substantial memory and processor resources (e.g., television-enabled personal computers, television recorders equipped with hard disk) to a low-resource device with limited memory and/or processing resources (e.g., traditional set-top boxes).

Communication of content 112 to the clients 104, 106 may be performed in a variety of ways. For example, the clients 104, 106 may be communicatively coupled to the content provider 108 (which may be representative of one or more content providers) using a packet-switched network, e.g., the Internet. Accordingly, the clients 104, 106 may receive one or more items of content 116 directly from the content provider 108, e.g., via one or more websites. The content 116 may include a variety of data, such as television programming, video-on-demand (VOD) files, one or more results of remote application processing, and so on. A variety of other examples are also contemplated, such as by using an indirect distribution example in which the content 114 is communicated over the network connection 110 to the network operator 102.

Content 114, as illustrated in FIG. 1, is communicated to the network operator 102 (e.g., via a network connection and/or computer-readable media) and may be stored as one or more items of content 114. The content 114 may be the same as or different from the content 114 received from the content provider 108. The content 114, for instance, may include additional data for broadcast to the client 104. For example, the content 114 may include electronic program guide (EPG) data from an EPG database for broadcast to the client 104 utilizing a carousel file system and an out-of-band (OOB) channel. Distribution from the network operator 102 to the clients 104, 106 over a network connection may be accommodated in a number of ways, including cable, radio frequency (RF), microwave, digital subscriber line (DSL), and satellite using a variety of networks as previously described for network 110.

The clients 104, 106, as previously stated, may be configured in a variety of ways to receive the content 114 via the network 110. The clients 104, 106 typically include hardware and software to transport and decrypt content 114 received from the network operator 102 for output and/or rendering, e.g., by the illustrated display devices. Although display devices are shown, a variety of other output devices are also contemplated, such as speakers. Further, although the display device is illustrated separately from the client 104, it should be readily apparent that a client may also include the display device as an integral part thereof as illustrated for client 106.

The clients 104, 106 may also include personal video recorder (PVR) functionality, e.g., may be configured as a PVR. For instance, the client 104 is illustrated as including storage to record content 114 as content 116 received via the network 110 for output to and rendering by the display device. The storage may be configured in a variety of ways, such as a hard disk drive, a removable computer-readable medium (e.g., a writable digital video disc), and so on. Thus, content 116 that is stored in the storage of the client 104 may be copies of the content 114 that was streamed from the network operator 102. Additionally, content 116 may be obtained from a variety of other sources, such as from a computer-readable medium that is accessed by the client 104, and so on. For example, content 116 may be stored on a digital video disc (DVD) when the client 104 is configured to include writeable DVD functionality.

The clients 104, 106 include respective client communication modules 118, 120 that are representative of functionality of the respective clients 104, 106 to control content interaction, such as through the use of one or more "control functions". The control functions may include a variety of functions to control output of content, such as to control volume, change channels, select different inputs, configure surround sound, and so on. The control functions may also provide non-linear playback of the content 116 (i.e., time shift the playback of the content 116) such as pause, rewind, fast forward, slow motion playback, and the like. For example, during a pause, the client 104 may continue to record the content 114 received via the network 110 in storage as content 116. The client 104, through execution of the client communication module 118, may then playback the content 116, starting at the point in time the content 116 was paused, while continuing to record the currently-broadcast content 114 in storage from the network operator 102.

When playback of the content 116 is requested, the client communication module 118 retrieves the content 116. The client communication module 118 may also restore the content 116 to the original encoded format as received from the content provider 108. For example, when the content 116 is recorded in storage, the content 116 may be compressed. Therefore, when the client communication module 118 retrieves the content 116, the content 116 is decompressed for rendering by the display device.

The network operator 102 is illustrated as including a manager module 122. The manager module 122 is representative of functionality to configure content 114 for output (e.g., streaming) over the network 110 to the client 104. The manager module 122, for instance, may configure content 114 received from the content provider 108 to be suitable for transmission over the network 110, such as to "packetize" the content 114 for distribution over the Internet, configuration for a particular broadcast channel, and so on.

Thus, in the environment 100 of FIG. 1, the content provider 108 may provide the content 112 to a multiplicity of network operators, an example of which is illustrated as network operator 102. The network operator 102 may then stream the content 114 over a network 110 to a multitude of clients, examples of which are illustrated as clients 104, 106. Client 104, for instance, may then store the content 114 in storage as content 116, such as when the client 104 is configured to include digital video recorder (DVR) functionality, and/or output the content 114 directly.

The client communication modules 118, 120 of clients 104, 106 are further illustrated as including respective content monitoring modules 124, 126 that are representative of functionality to form respective content lists 128, 130. The content lists 128, 130 describe interaction of the respective clients 104, 106 with content, e.g., content 114 and/or content 116. For example, the client monitoring module 124 may be executable to monitor which content 114, 114 is output by the client 104 and form the content list 126 to describe this output. The content list 126 may then be provided via the network 110 to a website, an example of which is shown in the environment 100 of FIG. 1 as a social network website 128.

A social network website 132 is illustrated as including a website manager module 134 and a content manager module 136. A website manager module 134 is representative of functionality of the social network website 132 to provide a website having one or more webpages accessible via network 110. For example, the client communication modules 118, 120 may be configured as browsers that are executable to navigate over the network 110, such as to locate the one or more webpages provided by the website manager module 134.

The content manager module 136 is representative of functionality of the social network website 132 to incorporate techniques related to content usage by the clients 104, 106. Continuing with the previous example, the content manager module 136 may use the content lists 128, 130 collected from the clients 104, 106 via the network 110 to "learn" what content is output by the clients 104, 106 and perform one or more actions based on this knowledge.

For instance, the content manager module 136 may compare the content list 128 received from client 104 with the content list 130 received from client 106. The comparison may be used for a variety of purposes. For example, a "delta" may be computed to determine which items of content were viewed by one user and not another user. The delta may then be used as a basis for suggesting items of content to be viewed by the other user. Similar techniques may also be used to recommend content for the user of client 104 as well as other users, e.g., users that navigate to the social network website 132 but are not members of the social network website 132. A variety of other examples are also contemplated, further discussion of which may be found in relation to the following procedures.

Although functionality represented by the content monitoring modules 124, 126 is illustrated as being employed by respective clients 104, 106, it should be readily apparent that this functionality may be incorporated in a variety of ways. As illustrated in the environment 100 of FIG. 1, the network operator 102 is also illustrated as including a content monitoring module 136 that is operable to form a content list 138. For instance, the network operator 102 may be configured to stream content 114 over the network 110 to the client 104, 106 that is requested by the respective clients 104, 106. Thus, the content monitoring module 136 can obtain "knowledge" of what content is requested by which of the respective clients 104, 106 and form a content list 138 that references the content and the respective clients. A variety of other examples are also contemplated, such as incorporation of the functionality represented by the content monitoring module in a "stand-alone" web service separate from the network operator 102 and/or the social network website 132.

Figure 2:
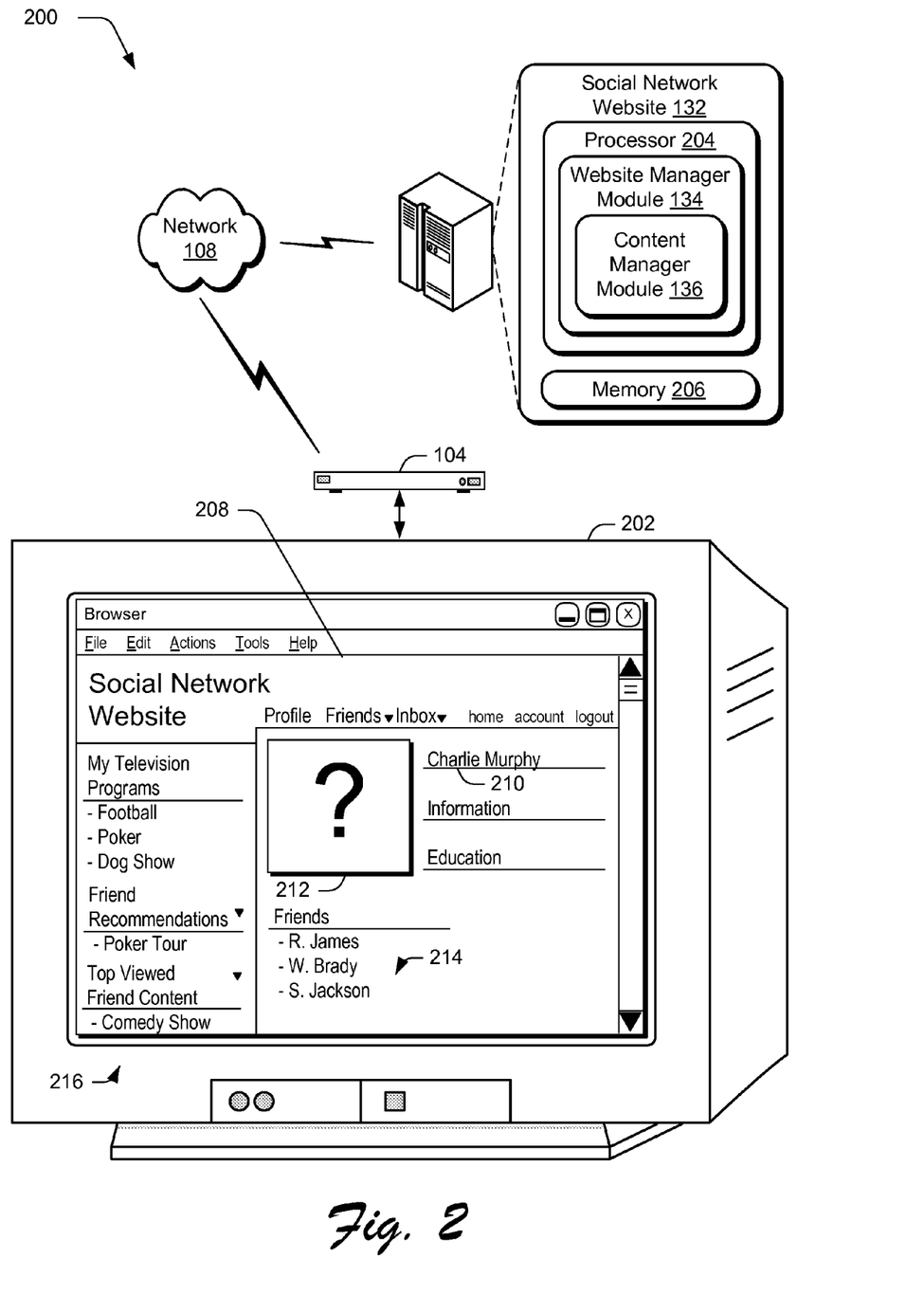
FIG. 2 depicts a system in an example implementation in which a display device of a client of FIG. 1 is illustrated as outputting a webpage obtained from a social network website of FIG. 1.

FIG. 2 depicts a system 200 in an example implementation in which a display device 202 of the client 104 of FIG. 1 is illustrated as outputting a webpage obtained from the social network website 132 of FIG. 1. The social network website 132 is illustrated in greater detail in FIG. 2 and shown as being provided by a server that may be representative of one or more servers, e.g., a server farm. The server is further illustrated as including a processor 204 and memory 206, which may each be representative of one or more processors and memory, respectively.

Processors are not limited by the materials from which they are formed or the processing mechanisms employed therein. For example, processors may be comprised of semiconductor (s) and/or transistors (e.g., electronic integrated circuits (ICs)). In such a context, processor-executable instructions may be electronically-executable instructions. Alternatively, the mechanisms of or for processors, and thus of or for a computer, may include, but are not limited to, quantum computing, optical computing, mechanical computing (e.g., using nanotechnology), and so forth. Additionally, although a single memory 206 is shown, a wide variety of types and combinations of memory may be employed, such as random access memory (RAM), hard disk memory, removable medium memory, and other types of computer-readable media.

A user interface 208 is shown in the illustrated example as a webpage that is obtained from the social network website 132 via network 110. Thus, the client communication module 118 of FIG. 1 may be configured as a browser. The social network website 132 may provide a variety of functionality to a user of the client 104 via the user interface 208. For example, the user interface 208 may include a portion 210 to display a name of a user the corresponds to the user interface 208 (which in the illustrated instance is "Charlie Murphy"), a portion 212 for a picture of the user, and a portion 214 that lists one or more user groups (e.g., "friends") associated with the user.

The website manager module 134 may also be executed to provide a variety of functionality through definition of a user group. For example, a user group 214 may be defined to permit messages to be exchanged between members of the user group 214, e.g., via texts, "posted" messages (e.g., "posts" that are displayable on the user interface 208), email messages, instant messaging, and so on. In an implementation, the website manager module 134 restricts messages that are to be communicated to a user of the client 104 that are not members of a user group that includes the user, such as to restrict communication of "spam". A variety of other examples are also contemplated.

A website manager module 134, through execution of the content manager module 136, may also provide a variety of functionality related to content usage by the clients 104, 106. For example, the user interface 208 is also illustrated as including a portion 216 that is configured to leverage knowledge of which content (e.g., television programming) is output by which clients. For example, the illustrated portion 216 includes a subportion titled "My Television Programs" and a listing of television programs that include "Football", "Poker", and "Dog Show" that describe the top three most watched items of content by a user that corresponds to the user interface 208, e.g., "Charlie Murphy".

Another subportion of the user interface 208 includes a listing of "Friend Recommendations". The "Friend Recommendations" may be computed in a variety of ways. For example, the content manager module 136 may collect content lists 128, 130 from the clients 104, 106, respectively. The content manager module 136 may then compare the content lists 128, 130, one with another, to determine which of the content 114 was consumed by client 106 but not client 104. An identifier of this content may then be output in the "Friend Recommendations" subportion of the user interface 208.

The social network website 132 may also provide a variety of other functionality that leverages "knowledge" of which content is output by which clients. In the illustrated example of the user interface 208, a further subportion describes "Top Viewed Friend Content", which may reference content that was output most often by the "Friends" user group. A variety of other examples are also contemplated, further discussion of which may be found in relation to FIG. 5.

Figure 3:
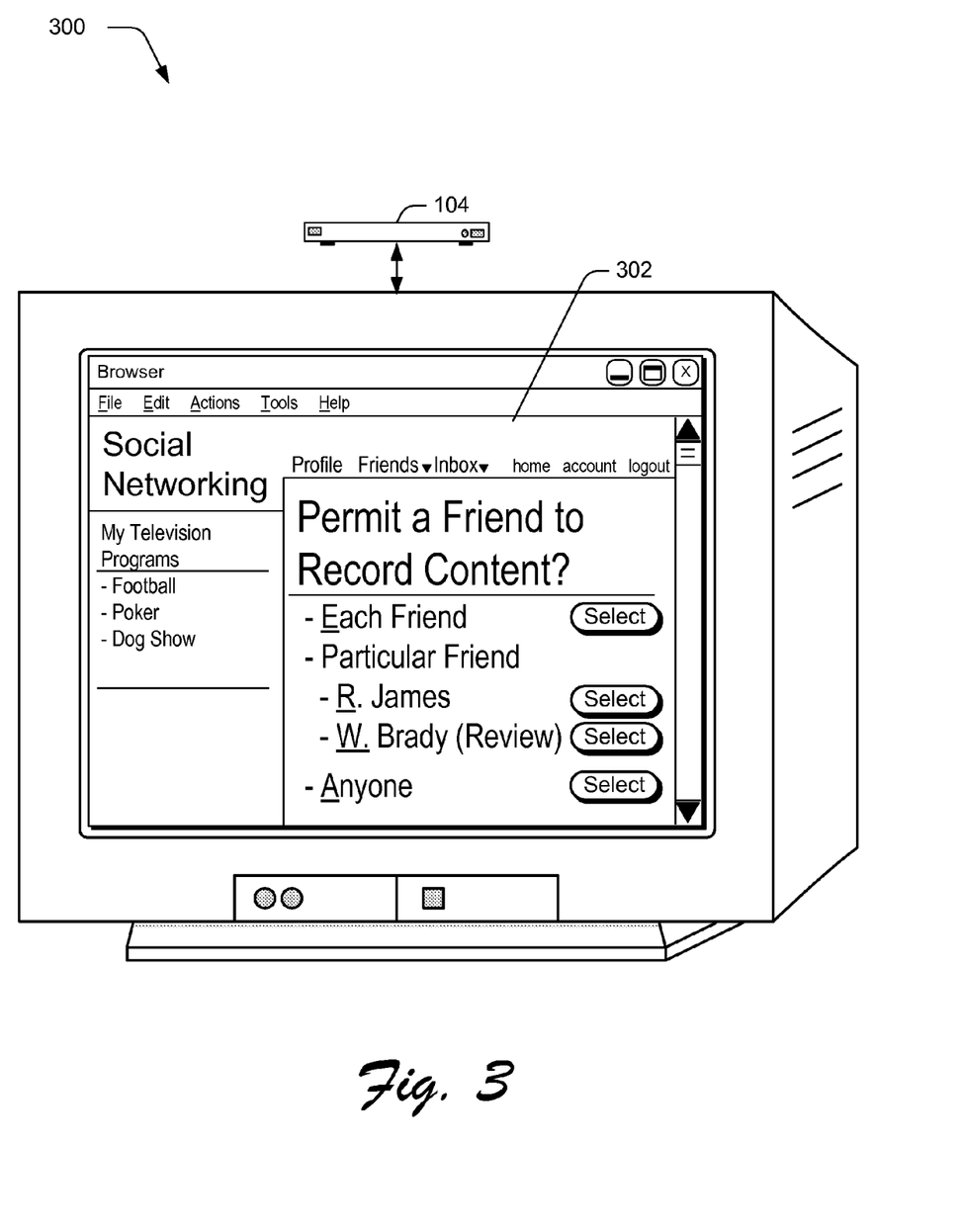
FIG. 3 illustrates an example implementation showing a user interface as being output by a client of FIGS. 1 and 2 that includes an option that is selectable to enable another user to record content for a user that corresponds to the user interface.

FIG. 3 illustrates an example implementation 300 showing a user interface 302 as being output by the client 104 that includes an option that is selectable to enable another user to record content for a user that corresponds to the user interface 302. In the illustrated implementation, the user interface 302 includes text to notify a user of an option to "Permit a Friend to Record Content?" This option permits a user to cause content to be recorded by a client of the user that selected the option. Continuing with the previous example, the user "Charlie Murphy" that is associated with the illustrated webpage of the social network website 132 may view a variety of options that may be used to permit users to cause content to be recorded.

A first option is illustrated as "Each Friend" that, when selected, permits users that are specified as "Friends" of the user to cause content to be recorded. A second illustrated option permits particular friends to be specified (e.g., "R. James" and/or "W. Brady") to cause content to be recorded. A third illustrated option permits "Anyone" to cause content to be recorded for the user, such as to permits users that access a webpage that corresponds to the user (e.g., the user interface 202 of FIG. 1) to cause content to be recorded for the user.

Content may be recorded for a user in a variety of ways. For example, the content may be recorded locally to a device of the user, such as a personal video recorded (PVR). In another instance, content may be recorded on behalf of the user that is accessible via the network, such as in a network personal video recorder example. A variety of other examples are also contemplated, such as to record content by the other user's PVR (e.g., R. James) which is then exposed for access by the user, e.g., Charlie Murphy. In another example, a hierarchical relationship may be used as a basis for the recommendations, such as to use "friends of friends" to map recommendations, impact a list of top ten content, and so on.

Figure 4:
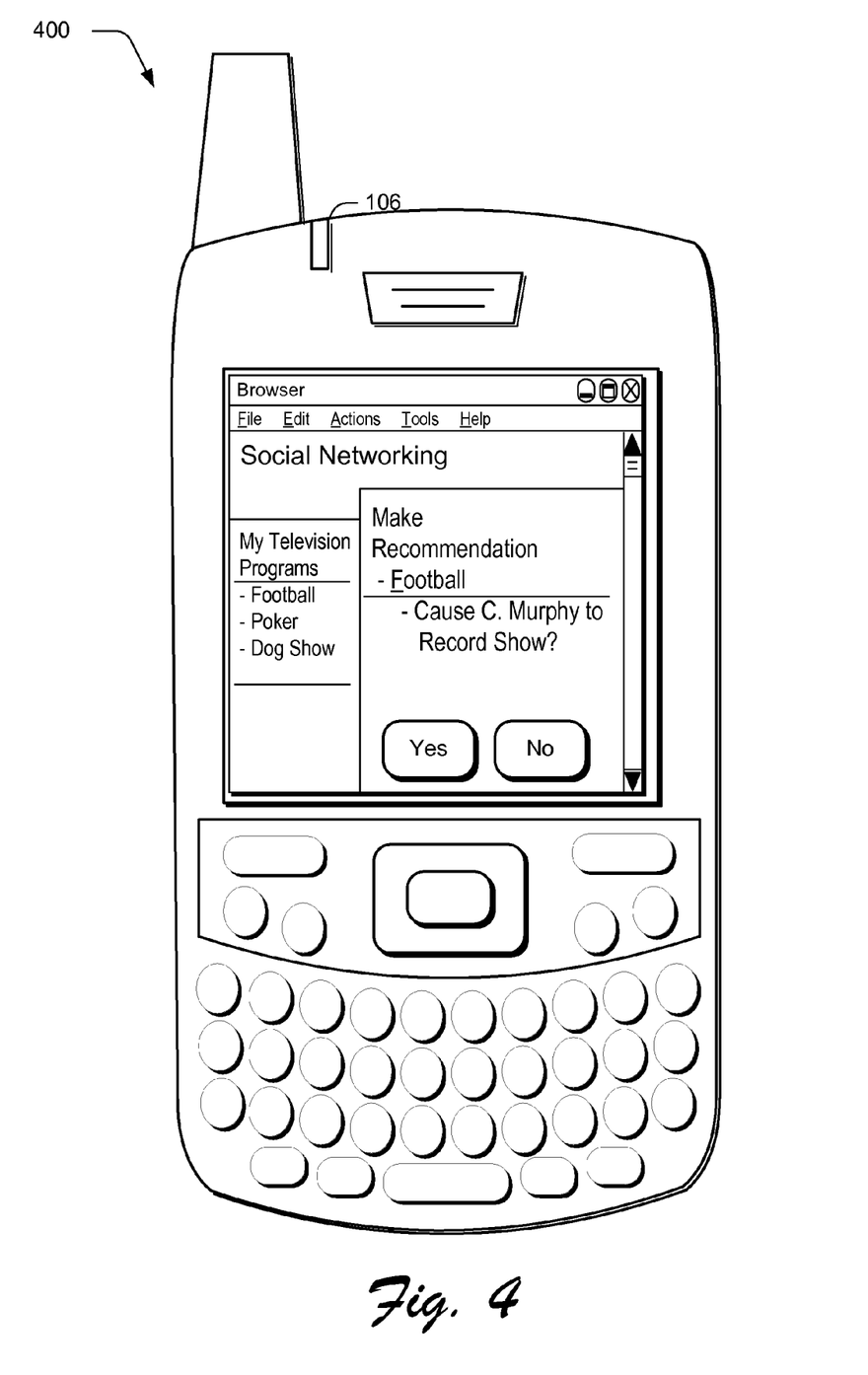
FIG. 4 illustrates an example implementation in which a client specified in the user interface of FIG. 3 inputs a recommendation to cause recordation of content at the client of FIG. 3.

FIG. 4 illustrates an example implementation 400 in which a client specified in the user interface 302 of FIG. 3 inputs a recommendation to cause recordation of content at the client of FIG. 3. The client 106 of FIG. 1 is illustrated as outputting a user interface 402 configured as a webpage obtained from the social network website 136. The user interface 402 includes an option for the user to cause the user of FIG. 3 (e.g., C. Murphy) to record a television program, which in this instance is illustrated as "Football". The user that interacts with the user interface 402 of FIG. 4 may specify the content to be recorded in a variety of ways, such as specify a title, selecting from a drop-down menu, selection in an electronic program guide, and so on. The user may then confirm that recordation of the content is desired, an example of which is illustrated in the user interface 402.

In another example, a friend of the user Charlie Murphy (e.g., R. James) may view television programs that are to be recorded by Charlie Murphy and decide to record one or more of those television programs themselves. Accordingly, this friend may be provided an option to record the content, such as by "right clicking" the title to output a pop-up menu to cause the content to be recorded on the user's own PVR, e.g., the PVR of R. James. The recording may then be performed automatically and without further user intervention through communication between the social network website and the PVR of R. James.

Generally, any of the functions described herein can be implemented using software, firmware, hardware (e.g., fixed-logic circuitry), manual processing, or a combination of these implementations. The terms "module", "functionality" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the techniques to manage content are platform-independent, meaning that the techniques may be implemented on a variety of commercial computing platforms having a variety of processors.

Example Procedures

The following discussion describes management techniques that may be implemented utilizing the previously described environment, systems, user interfaces and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and systems 200-400 of FIGS. 2-4, respectively.

Figure 5:
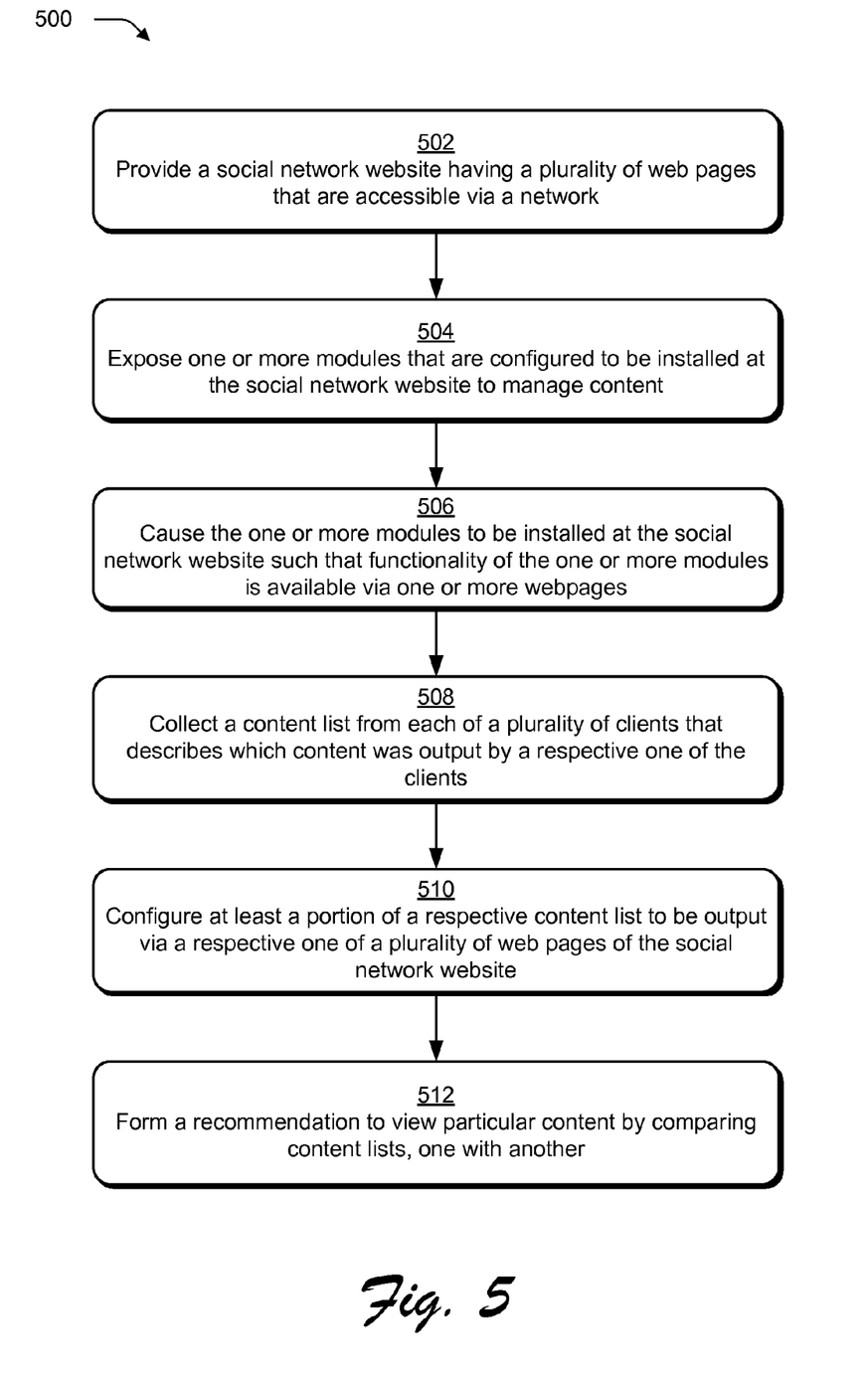
FIG. 5 depicts a flowchart describing a procedure in an example implementation in which an application is provided that is configured to be installed on a social network website to manage content.

FIG. 5 depicts a procedure 500 in an example implementation in which an application is provided that is configured to be installed on a social network website to manage content. A social network website is provided having a plurality of webpages that are accessible via a network (block 502). For example, the social network website may provide functionality such that users (e.g., members) of the social network website may share messages and other information with each other.

One or more modules are exposed that are configured to be installed at the social network website to manage content (block 504). For example, an entity (e.g., the network operator 102) may write the content manager module 136 and/or content monitoring modules 124, 126 to manage content. These modules may then be exposed (e.g., via a website of the network operator 102, made available on a computer-readable medium, and so on) such that the clients 104, 106 may cause the one or more modules to be installed on the social network website 132 such that the functionality of the one or more modules is available via one or more of the webpages of the social network website (block 506).

A content list is collected from each of a plurality of clients that describes which content was output by a respective one of the clients (block 508). For example, the content monitoring modules 124, 126 of the respective clients 104, 106 may be executed to monitor interaction of the clients with respective content, e.g., content 114 and/or content 116. Content lists 128, 130 may then be formed that describe this interaction.

Content lists 128, 130 may be collected by the social network website 132, and more particularly the content manager module 136, in a variety of ways. For example, the content lists 128, 130 may be "pushed" to the content manager module 136, "pulled" by the content manager module 136, and so on.

At least a portion of a respective content list is configured to be output via a respective one of a plurality of webpages of the social network website (block 510). The output may be performed in a variety of ways. For example, a "top 10 list" may be provided that details the top 10 items of content output by "friends" of the client. In another example, recommendations may be formed by comparing content lists, one with another (block 512). For instance, the content manager module 136 may compute a "delta" between what the client has output and what friends of the client have output as previously described. A variety of other examples are also contemplated without departing from the spirit and scope thereof, such as the previously described example in which the friends of the user may cause content to be recorded on their own PVRs based on what content is exposed in the content list via the social network website.

Figure 6:
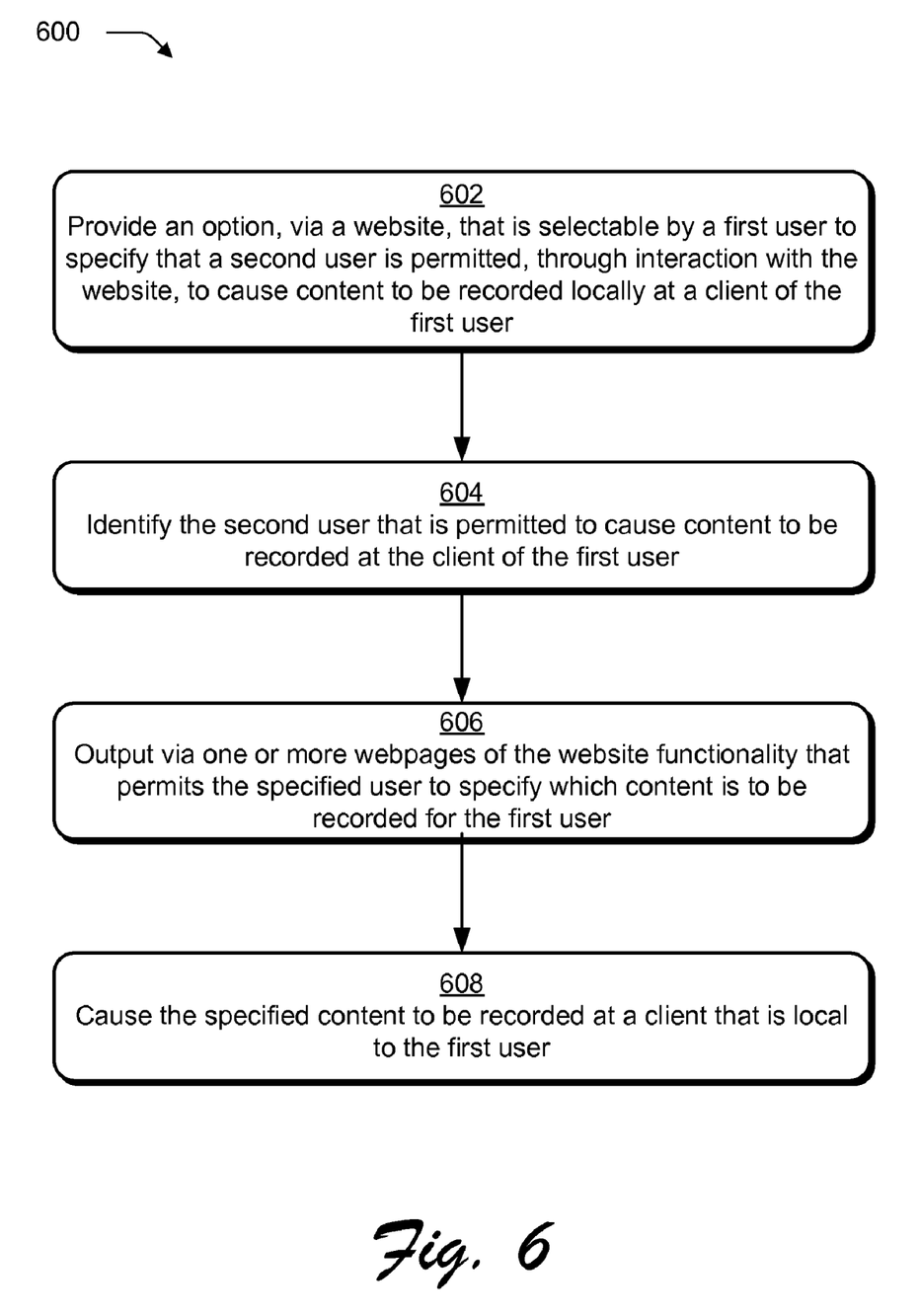
FIG. 6 depicts a flowchart describing a procedure in an example implementation in which an option is provided that may be set by a user to enable another user to cause content to be recorded on behalf of the user that set the option.

FIG. 6 depicts a procedure 600 in an example implementation in which an option is provided that may be set by a user to enable in another user to cause content to be recorded on behalf of the user that set the option. An option is provided, via a website, that is selectable by a first user to specify the second user is permitted, through interaction with the website, to cause content be recorded locally at the client of the first user (block 602). Continuing with the previous example of FIG. 5, users may interact with a social network website 132. An option may be provided via a social network website 132, an example of which was previously described in relation to FIG. 4, in which a user may cause content (e.g., television programming and/or music) to be recorded locally at the client of the user, e.g., a personal video recorder, a digital music player, and so on. Therefore, in this example the clients 104, 106 are communicatively coupled to the social network website 132 via a wide area network (e.g., Internet) and are not communicatively coupled to each other (e.g., the clients 104, 106) via a local area network.

The first user, through interaction with the user interface (e.g., webpage), may identify the second user that is permitted to cause content to be recorded at the client of the first user (block 604) in a variety of ways. As previously described in relation to FIG. 3, for instance, the user may specify that each member of a user group (e.g., "friends") that includes the user they be permitted to cause the content to be recorded on behalf of the user. In another instance the user may specify a particular user (e.g., a particular friend and/or other user that is not a friend or member of the social network website 132) that is permitted to cause content to be recorded. A variety of other instances are also contemplated as previously described in relation to FIG. 3.

The specified content is caused to be recorded at the client that is local to the first user (block 608). For instance, the content manager module 136 may interact with the client communication module 118 to cause content 114 that is streamed over network 110 by the network operator 102 to be recorded in storage as content 116. In another instance, the content manager module 136 may interact with the manager module 122 of network operator 102 to cause particular content 114 to be streamed over the network 110 to the client 104. A variety of other instances are also contemplated, such as a network personal video recorder example as previously described in which content is recorded by the network operator 102.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. One or more computer-readable storage media devices comprising instructions that are executable to:
   collect content lists from users of a website that describe which media content was viewed by the users;
   provide an option that is selectable by a first user at a first client device via a particular webpage of the website to permit a second user at a second client device that is remote from the first client device to cause the first client device of the first user to record media content locally at the first client device of the first user, the particular webpage including at least a portion of a respective said content list that references a particular said media content item for selection by the second user to cause the first client device to record the particular said media content item based on permission given by the first user via the selectable option provided via the particular webpage;
   form a recommendation to view particular said media content by comparing a first said content list associated with the first user to a second said content list associated with the second user; and
   recommend the particular said media content to be viewed by the first user at the client device of the first user based on the particular media content being included on the second said content list but not on the first said content list.

2. One or more computer-readable storage media devices as described in claim 1, wherein the second user is specified such that the second user is uniquely identified by the first user.

3. One or more computer-readable storage media devices as described in claim 1, wherein the second user is specified as being included in a particular group of users.

4. One or more computer-readable storage media devices as described in claim 3, wherein:
   the website is a social network website; and
   the particular group of users includes users that are specified as being in a user group by the first user through interaction with the social network website.

5. One or more computer-readable storage media devices as described in claim 4, wherein the user group is defined such that users within the group are permitted to exchange messages, one with another, which otherwise would not be permitted if the users were not within the group.

6. One or more computer-readable storage media devices as described in claim 4, wherein the user group is defined such that users within the group are permitted to post one or more messages that are displayable on one said webpage of the social network website of another one of the users of the particular group.

7. One or more computer-readable storage media devices as described in claim 1, wherein the client device of the first user is a personal video recorder (PVR).

8. One or more computer-readable storage media devices as described in claim 1, wherein:
   the website is accessible by the second user using a browser that is executable at a client device of the second user; and the client device of the first user and the client device of the second user are each communicatively coupled to the website via a wide area network and are not communicatively coupled to each other via a local area network.

9. A method comprising:

collecting a content list from each of a plurality of client devices that describes which media content was output by a respective said client device;

configuring at least a portion of a respective said content list to be output via a respective one of a plurality of web pages of a social network website, the portion of the respective said content list referencing a particular media content item that is selectable, via a particular said webpage that output the portion, by a user at a first client device to cause a second client device that is remote from the first client device and associated with a second user to record the particular said media content item locally at the second client device, the particular media content item being selectable by the user to cause the second client device to record the particular said media content item based on permission given by the second user via a selected option on the particular said webpage; and forming a recommendation to view particular said media content by comparing a respective said content list from each of the plurality of client devices, one with another, and recommending the particular said media content to be viewed by the second user at the second client device based on inclusion of the particular said media content on at least one respective said content list but not on a content list associated with the second user.

10. A method as described in claim 9, wherein the media content is music.

11. A method as described in claim 9, wherein the collecting is performed automatically and without intervention of a respective user at the respective said client device.

12. A method as described in claim 9, wherein the user is a member of a group of users that include a particular said user that corresponds to the particular said webpage.

13. An apparatus comprising:

a processor; and memory that is configured to maintain one or more modules that are executable on the processor to:

collect content lists from users of a social network website that describe which media content was output by client devices associated with the users;

provide the social network website having a plurality of web pages that are accessible via a network;

present one or more recommendations for a first user, via one or more of the web pages, regarding one or more items of content based on which content was viewed by other users according to respective said content lists of the other users and in part on which content was not included on a content list of the first user, the one or more recommendations including a user review of viewed content by the other users; and provide an option, via a particular web page of the social network website, that is selectable by the first user at a first client device to permit a second user at a second client device that is remote from the first client device to cause at least one of the one or more items of content to be recorded on behalf of the first user at the first client device of the first user, the particular web page including at least a portion of a respective said content list that references a particular said media content item for selection by the second user to cause the first client device to record the particular media said content item based on permission given by the first user via the selectable option provided via the particular web page.

14. The apparatus as described in claim 13, wherein at least one of the users of the social network website has an account that associates at least one said web page with the at least one of the users.

15. The apparatus as described in claim 13, wherein the one or more of the web pages correspond to one or more users that viewed the content.

16. The apparatus as described in claim 13, wherein the one or more web pages correspond to another user that did not view the content.

17. The apparatus as described in claim 13, wherein the one or more modules are executable on the processor to form a notification that describes a change in which items of the content are to be recorded on behalf of the first user.

18. The apparatus as described in claim 13, wherein the users of the social network website are associated with a respective content list that describes which media content was output by a client device associated with a respective said user.

19. The apparatus as described in claim 18, wherein the one or more modules are further configured to compare content lists of respective said users one with another, to recommend particular media content to be viewed by a respective said user.

20. A method as described in claim 13, wherein the client device of the first user is a personal video recorder (PVR).

* * * * *